US012562071B2

(12) United States Patent
Salmon et al.

(10) Patent No.: US 12,562,071 B2
(45) Date of Patent: Feb. 24, 2026

(54) LATERAL AVOIDANCE TRAJECTORIES

(71) Applicant: Rockwell Collins France S.A.S., Blagnac (FR)

(72) Inventors: Philippe Salmon, Colomiers (FR); Elias Bitar, Tournefeuille (FR)

(73) Assignee: Rockwell Collins France S.A.S., Blagnac (FR)

( * ) Notice: Subject to any disclaimer, the term of this patent is extended or adjusted under 35 U.S.C. 154(b) by 90 days.

(21) Appl. No.: 18/750,659

(22) Filed: Jun. 21, 2024

(65) Prior Publication Data

US 2025/0069513 A1 Feb. 27, 2025

(30) Foreign Application Priority Data

Aug. 21, 2023 (EP) .................................... 23306399

(51) Int. Cl.

*G08G 5/80* (2025.01)
*G08G 5/21* (2025.01)
*G08G 5/74* (2025.01)

(52) U.S. Cl.

CPC ................. *G08G 5/80* (2025.01); *G08G 5/21* (2025.01); *G08G 5/74* (2025.01)

(58) Field of Classification Search

CPC .. G08G 5/80; G08G 5/21; G08G 5/74; G08G 5/76; G08G 5/53; G08G 5/55; G01C 21/3826; G01C 21/20; G01C 23/00

See application file for complete search history.

(56) References Cited

U.S. PATENT DOCUMENTS

| | | | | |
|---|---|---|---|---|
| 6,484,072 | B1 * | 11/2002 | Anderson | G01C 23/005 701/16 |
| 8,046,119 | B2 * | 10/2011 | Bitar | G01C 21/20 701/4 |
| 8,494,761 | B2 * | 7/2013 | Giovannini | G08G 5/723 340/963 |
| 9,304,514 | B2 | 4/2016 | Kozlow et al. | |

(Continued)

FOREIGN PATENT DOCUMENTS

| | | |
|---|---|---|
| CN | 114510070 A | 5/2022 |
| CN | 110243359 B | 3/2023 |
| EP | 2187371 A1 | 5/2010 |

OTHER PUBLICATIONS

European Patent Office, Extended European Search Report received in EP Application No. 23306399.9, Feb. 29, 2024, 8 pages.

*Primary Examiner* — Behrang Badii
(74) *Attorney, Agent, or Firm* — Suiter Swantz IP

(57) ABSTRACT

A method for calculating lateral avoidance trajectories for an aircraft includes obtaining data indicative of current aircraft position, current track, current roll, current airspeed, current vertical speed, current altitude, and maximum achievable roll of the aircraft. The method includes calculating a current trajectory of the aircraft and calculating a left trajectory and right trajectory of the aircraft corresponding to the aircraft turning left/right at the maximum achievable roll from the current aircraft position. The method also includes obtaining local terrain elevation grid data; determining intersections between the local terrain elevation grid, and each of the current trajectory, left trajectory, and right trajectory and providing an indication, of any intersections between the local terrain elevation grid, and each of the trajectories.

15 Claims, 5 Drawing Sheets

(56) References Cited

U.S. PATENT DOCUMENTS

| | | | | |
|---|---|---|---|---|
| 10,967,986 | B2 | 4/2021 | Prosser | |
| 2007/0102575 | A1* | 5/2007 | Morgan | B64C 5/02<br>244/87 |
| 2020/0410877 | A1 | 12/2020 | Prosser | |

* cited by examiner

LATERAL AVOIDANCE TRAJECTORIES

CROSS-REFERENCE TO RELATED APPLICATIONS

The present application claims the benefit of European Patent Application No. 23306399.9, filed Aug. 21, 2023, which is herein incorporated by reference in the entirety.

FIELD

This disclosure relates to methods and systems for calculating lateral avoidance trajectories.

BACKGROUND

When flying close to the terrain, an aircraft operator needs to monitor their capability to perform terrain avoidance manoeuvres whilst maintaining a safe clearance with the surrounding terrain. Terrain avoidance manoeuvres include rapid climbs and lateral turn manoeuvres.

Vertical avoidance (e.g., by rapidly climbing) may not always be the best avoidance manoeuvre, for example in the case of rotorcraft which may have more limited fast climbing capability compared to fixed wing aircraft. In such cases, a lateral turn may be a better avoidance manoeuvre, but in an emergency situation, the aircraft operator must quickly evaluate which manoeuvre is the safest, and in particular, in which direction it is possible to perform a lateral turn without contacting the terrain.

Such an evaluation is complicated, particularly in scenarios when trajectory drifting due to wind must be factored in. This evaluation uses up time in an emergency situation, and the decision which an aircraft operator comes to may not be correct, especially when the aircraft operator is under significant stress.

SUMMARY

According to this disclosure, there is provided a method for calculating lateral avoidance trajectories for an aircraft, the method comprising: obtaining aircraft data indicative of current aircraft position, current track, current roll, current airspeed, current vertical speed, current altitude, and maximum achievable roll of the aircraft; calculating, based on the obtained aircraft data, a current trajectory of the aircraft from the current aircraft position; calculating, based on the obtained aircraft data, a left trajectory of the aircraft corresponding to the aircraft turning left at the maximum achievable roll from the current aircraft position; calculating, based on the obtained aircraft data, a right trajectory of the aircraft corresponding to the aircraft turning right at the maximum achievable roll from the current aircraft position; obtaining local terrain elevation grid data; determining intersections between the local terrain elevation grid, and each of the current trajectory, left trajectory, and right trajectory; and providing an indication of any intersections between the local terrain elevation grid and each of the current trajectory, left trajectory, and right trajectory.

According to this disclosure, there is further provided a system for calculating lateral avoidance trajectories, the system comprising: a calculation unit configured to: obtain aircraft data including at least current aircraft position, current track, current roll, current airspeed, current vertical speed, current altitude, and maximum achievable roll of the aircraft; calculate, based on the obtained aircraft data, a current trajectory of the aircraft; calculate, based on the obtained aircraft data, a left trajectory of the aircraft corresponding to the aircraft turning left at the maximum achievable roll; calculate, based on the obtained aircraft data, a right trajectory of the aircraft corresponding to the aircraft turning right at the maximum achievable roll; obtain local terrain elevation grid data from a terrain elevation database; and determine intersections between the local terrain elevation grid, and each of the current trajectory, left trajectory, and right trajectory; and an indication unit configured to provide an indication of any intersections between the between the local terrain elevation grid and each of the current trajectory, left trajectory, and right trajectory.

It will be understood that since the trajectories are determined based on (e.g., using) (e.g., all of) the current aircraft data (current position, track, airspeed, etc.), the disclosed method and system help to provide a dynamic output which may be updated continuously throughout a flight.

In some examples, the method may further include obtaining local wind data including at least current wind direction and current wind speed, where the current trajectory, left trajectory, and right trajectory are calculated based on (e.g., using) the obtained aircraft data and on (e.g., all of) the obtained local wind data.

In some examples, calculating the current trajectory may include first calculating the current trajectory in a still air mass, and then modifying the trajectory using the obtained local wind data, e.g., drifting the aircraft from the current trajectory in a still air mass taking into account the effect of the obtained local wind data on the aircraft.

In some examples, the method may further include calculating the current trajectory for a time period $\Delta T$ from the current time. In some examples, $\Delta T$ is in the range 10 seconds to 10 minutes, e.g., 30 seconds to 5 minutes, e.g., 1 minute to 2 minutes.

In some examples, calculating the current trajectory may include determining a projected position of the aircraft at a plurality of points in time, where the plurality of points in time are separated by a time interval $\Delta t$, and where $\Delta t<\Delta T$. In some examples, $\Delta t$ is in the range 0.1 seconds to 5 seconds, e.g., 0.5 seconds to 2 seconds, e.g., approximately 1 second.

In some examples, calculating the left trajectory may include for each point in time on the current trajectory, calculating where the aircraft would be if it turned left at the maximum achievable roll rate.

In some examples, calculating the right trajectory may include for each point in time on the current trajectory, calculating where the aircraft would be if it turned right at the maximum achievable roll rate.

In some examples, calculating the current trajectory may include for each point in time on the current trajectory, calculating where the aircraft would be when applying the obtained local wind data, e.g., drifting the aircraft from each projected position of the current trajectory in a still air mass taking into account the effect of the obtained local wind data on the aircraft.

In some examples, the method may include calculating the left and right trajectories to the point of U-turn (e.g., until the point at which the aircraft has performed a turn through 180°). In such examples, the main practical limitation on the value of $\Delta T$ discussed above is that it must be greater than the amount of time which the aircraft will take to perform a U-turn, such that the left and right trajectories can be calculated to the point of U-turn. The amount of time taken to perform a U-turn is dependent on the aircraft but is unlikely to exceed 1 minute.

In some examples, the intersections are determined using an error margin such that if a distance between a trajectory and the local terrain elevation grid is less than a threshold (e.g., 1 m, 2 m, 3 m, 4 m, 5 m, 10 m), an intersection is determined.

The threshold may be fixed, but in some examples, the threshold may be dynamic. In some examples, the threshold may be set based on the aircraft data and/or the local wind data. For example, in high winds and/or for high airspeeds, the threshold may be set to a larger value.

The disclosed system and methods have application both to manned aircraft and unmanned aircraft. As such, in some examples, the method and system may be employed in an autonomous aircraft. In these examples, the indication unit is configured to send (and the indication takes the form of) a message to a flight controller (e.g., autonomous flight controller) of the autonomous system such that the flight controller can consider the information contained in the indication when controlling the aircraft.

In some examples, the indication unit may include a display unit, and the indication is provided (e.g., displayed) as an indication on the display unit to an aircraft operator (e.g., an operator on-board the aircraft, and/or a remote operator who is remotely controlling the aircraft). In some examples, the indication unit may include an audio unit, and the indication is provided as an audible warning (e.g., an audible voice warning that lateral escape is not possible in one or both directions).

In some examples, the indication may include displaying the current trajectory, the left trajectory and the right trajectory, e.g., overlaid on a representation of a map. In such examples, intersections may be displayed using icons, or the displayed trajectory may be terminated at the point of intersection.

In some examples, the indication may include displaying the current, left and right trajectories on a 3D map from an egocentric view or from an exocentric view.

In some examples, the aircraft data may include two different types, dynamic aircraft data (including the data indicative of current aircraft position, current track, current roll, current airspeed, current vertical speed, current altitude) and characteristic aircraft data (including the data indicative of the maximum achievable roll).

In some examples, the method may further include obtaining the dynamic and characteristic data separately (e.g., at different times and/or from different sources). The characteristic aircraft data is fixed and so, in some examples, the characteristic aircraft data (e.g., data indicative of the maximum achievable roll) may be obtained earlier than the dynamic data or may be stored locally (e.g., in the calculation unit, e.g., in a memory of the calculation unit). In some examples, the method may further include obtaining the characteristic aircraft data from an characteristic aircraft database. The characteristic aircraft database may be provided in the aircraft, or may be provided remotely.

With respect to local terrain elevation grid data and local wind data, local may be defined as within a distance from the current aircraft position, e.g., within 1 km, 2 km, 3 km, 4 km, 5 km, or 10 km of the current aircraft position.

According to this disclosure, there is further provided a system comprising: an aircraft; a terrain elevation database; and a system for calculating lateral avoidance trajectories as disclosed herein, where the calculation unit is configured to obtain the aircraft data at least partially from the aircraft and to obtain the terrain elevation data from the terrain elevation database.

In some examples, the system may further include a wind data provision system and the calculation unit is configured to obtain local wind data from the wind data provision system.

In some examples, the system may further include an characteristic aircraft database and the calculation unit is configured to obtain the aircraft data partially from the characteristic aircraft database.

In some examples, the aircraft data may include two different types, dynamic aircraft data (including the data indicative of current aircraft position, current track, current roll, current airspeed, current vertical speed, current altitude) and characteristic aircraft data (including the data indicative of the maximum achievable roll). In some examples, the calculation unit is configured to obtain the dynamic aircraft data from the aircraft and to obtain the characteristic aircraft data from the characteristic aircraft database.

BRIEF DESCRIPTION OF DRAWINGS

One or more non-limiting examples will now be described, by way of example only, and with reference to the accompanying figures in which.

DETAILED DESCRIPTION

The below described examples will be understood to be exemplary only.

Figure 1:
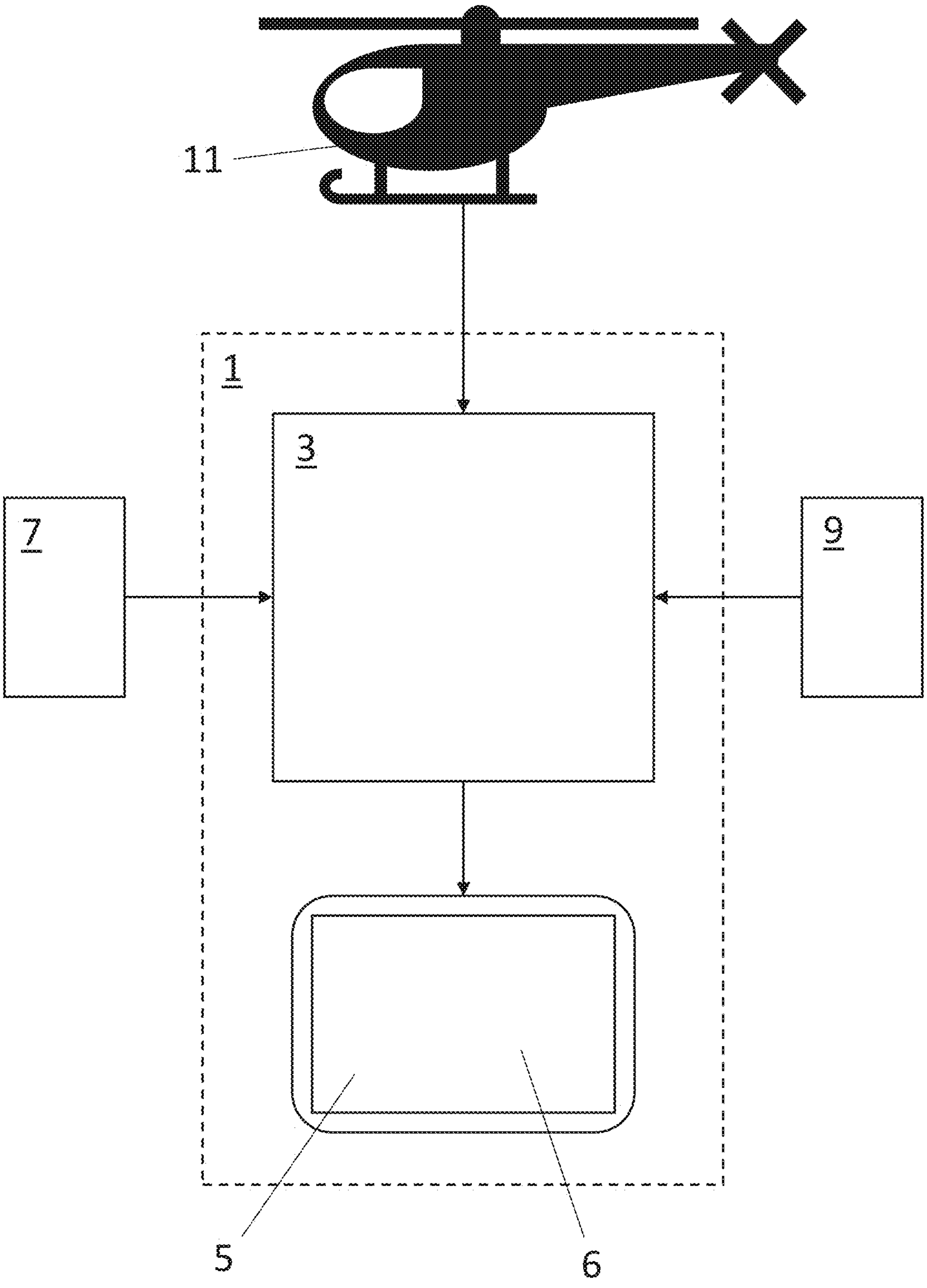
FIG. 1 is a schematic block diagram showing a system for calculating lateral avoidance trajectories and the elements with which the system is configured to communicate, in accordance with one or more embodiments of the present disclosure.

FIG. 1 shows a schematic block diagram of a system 1 for calculating lateral avoidance trajectories. The system includes a calculation unit 3 and a display unit 5.

The calculation unit 3 is configured to communicate with a terrain elevation database 7, a wind data provision system 9, and an aircraft 11, in order to obtain data which is used in the calculation of lateral avoidance trajectories. The calculation unit 3 is further configured to communicate with the indication unit 5 such that the calculated trajectories can be sent to the indication unit 5. In the illustrated example, the indication unit 5 is a visual display unit 5 for displaying the calculated trajectories to an aircraft operator.

The display unit 5 includes a screen 6 for displaying the trajectories, as is explained in more detail with reference to FIGS. 3 and 4. The system 1 may be integrated into an aircraft, or may be provided as a self-contained unit which can be retrofitted to an aircraft. It will be understood that the disclosed system is equally applicable to aircraft which may be under remote control, and as such, the system 1 could be integrated or retrofitted into a remote pilot station (RPS).

Figure 2:
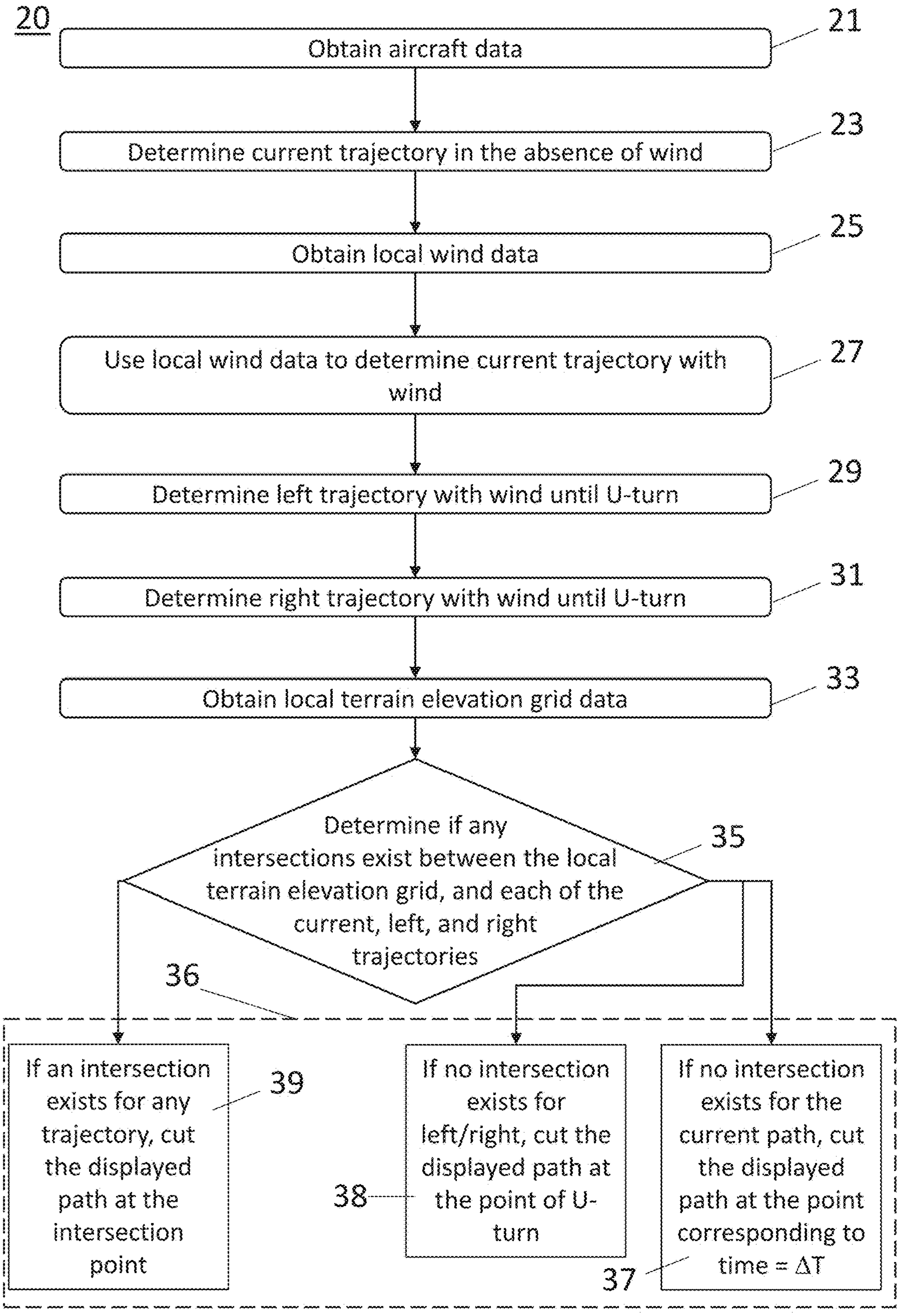
FIG. 2 is a flow chart illustrating a method for calculating lateral avoidance trajectories, in accordance with one or more embodiments of the present disclosure.

Operation of the system 1 will now be explained with reference to the flow chart of FIG. 2 and the calculation illustration of FIG. 3. FIG. 2 illustrates a method 20 for calculating lateral avoidance trajectories. FIG. 3 illustrates some of the steps of the method 20 by showing the points and trajectories which are determined throughout the method 20. FIG. 3 shows a reference compass 40 which defines the reference frame of the illustration. It can be seen that the aircraft 11 is flying North and, as an example only, the local wind is blowing from West to East.

At step 21 of the method 20, aircraft data is obtained from the aircraft 11. The aircraft data contains both dynamic aircraft data and characteristic aircraft data. The dynamic aircraft data includes dynamic (e.g., changing) information indicative of the current aircraft position, current track, current roll, current airspeed, current vertical speed, maximum achievable roll, and current altitude of the aircraft. The characteristic aircraft data includes fixed information indicative of a maximum roll which is achievable by the aircraft. In some examples the characteristic aircraft may include additional aircraft parameters such as the dimensions, maximum speed, or stall speed of the aircraft.

It will be understood that the exact source of the aircraft data will depend on the aircraft, and that, in any case, the exact source of the aircraft data does not have a bearing on the novel and inventive features of the disclosed system and method. For example, position data may be obtained from a Flight Management System installed in the aircraft 11. Alternatively, position data may be obtained directly from a global positioning (GPS) unit, potentially hybridized with an inertial unit. Airspeed data may be obtained from an air data unit, and vertical speed data may be computed from the variation of baro-altitude, or from the inertial unit, or hybridized.

Additionally the characteristic aircraft data may not be obtained from the aircraft at all, and may be obtained from a look-up table containing characteristic information for one or more different aircraft. This look-up table may be stored in local memory, or the system may include an characteristic aircraft database and the method may include obtaining the characteristic aircraft data from the characteristic aircraft database.

At step 23, the calculation unit 3 calculates a current trajectory for the aircraft 11 in a still air mass (e.g., in the absence of any wind data). Step 23 includes calculating a current trajectory for the aircraft up until a time period $\Delta T$ has elapsed from the current time. The trajectory is calculated by defining a plurality of points in time within the time period $\Delta T$, each point in time separated by a time interval $\Delta t$, where $\Delta t < \Delta T$.

Then, for each point in time, the projected position of the aircraft at that time is calculated based on the current aircraft position (latitude/longitude), above mean sea level (AMSL) altitude, airspeed, track, roll, and vertical speed.

Given the aircraft position ($lat_{ac}$, $lon_{ac}$, $alt_{ac}$), airspeed ($s_a$), vertical speed ($s_z$) and a roll ($\alpha$), the turn radius (r) is calculated according to the below equations. In the following equations, the value of the roll ($\alpha$) depends on the trajectory which is being calculated. For the current trajectory $\alpha$=current roll, for the left trajectory $\alpha$=maximum achievable roll (negative), for the right trajectory, $\alpha$=maximum achievable roll (positive).

First, the turn radius is calculated according to:

$$r = \frac{s_a^2}{g \cdot \tan(\alpha)}$$

Then the turn centre is located at the distance r from the aircraft position, along a bearing $\beta$ which is at 90° from the current track.

With R being equal to the earth radius, the parameter d is calculated:

$$d = \frac{r}{R}$$

Then the turn centre is located at:

$$lat_{tc} = a\sin(\sin(lat_{ac}) \cdot \cos(d) + \cos(lat_{ac}) \cdot \sin(d) \cdot \cos(\beta))$$

$$lon_{tc} = lon_{ac} + a\tan\left(\frac{\sin(\beta) \cdot \sin(d) \cdot \cos(lat_{ac})}{\cos(d) - \sin(lat_{ac}) \cdot \sin(lat_{tc})}\right)$$

The aircraft is seen from the turn centre along a bearing:

$$\gamma = \beta + 180°$$

During the duration $\Delta t$, the aircraft will turn by an angle $\delta$, where:

$$\delta = \frac{s_a \cdot \Delta t}{r}$$

Each point is then calculated as being at the distance r from the turn centre, along the bearing $\gamma$ which is incremented each time as:

$$\gamma \leftarrow \gamma + \delta \cdot \text{sign}(\alpha)$$

Then, in the same way as the turn centre is located, each point is located at:

$$lat_{ac} = a\sin(\sin(lat_{tc}) \cdot \cos(d) + \cos(lat_{tc}) \cdot \sin(d) \cdot \cos(\gamma))$$

$$lon_{ac} = lon_{tc} + a\tan\left(\frac{\sin(\gamma) \cdot \sin(d) \cdot \cos(lat_{tc})}{\cos(d) - \sin(lat_{tc}) \cdot \sin(lat_{ac})}\right)$$

The new aircraft altitude is given by:

$$alt_{ac} \leftarrow alt_{ac} + \Delta t \cdot s_z$$

It will be understood that the effective computation must normalize the bearing between 0, 360°.

Then the aircraft position points and turn centre are shifted due the wind, characterized by its speed ($s_w$) and its direction ($\tau$).

This calculation creates a plurality of trajectory points 41 (which are visualised in FIG. 3), one corresponding to each point in time, and as such, a trajectory 43 can be plotted by joining the trajectory points 41. The time interval $\Delta t$ should be chosen to be not so large that the trajectory 43 is not precise, but not so great as to be too computationally demanding. In some examples, $\Delta t$ may be in the range 0.5 to 2 seconds, and $\Delta T$ may be in the range 1 to 2 minutes, such that between 30 and 240 trajectory points 41 may be used to define the trajectory 43.

At step 25, local wind data is obtained from the wind data provision system 9. The wind data provision system 9 may be any suitable and desired system which is capable of providing the calculation unit 3 with local wind data (e.g., comprising the current wind direction and current wind speed). In some examples, the wind data provision system 9 may be a local weather station which is in communication with the system 1. Alternatively, the wind data provision system 9 may include a wind prediction system which computes predicted local winds based on sensed wind data from surrounding weather stations.

At step 27, the obtained local wind data is used to adjust the current trajectory 43, which was determined at step 23, to determine a current trajectory 47 which is adjusted for the local wind conditions. As such, the wind-adjusted current trajectory 47 determined at step 27 may be more accurate than the still air mass current trajectory 43 determined at step 23 since local wind conditions, especially in the case of strong winds, can have a significant effect on aircraft trajectory.

The still air mass current trajectory 43 is adjusted by applying the current wind direction and the current wind speed to each of the trajectory points 41 which were defined at step 23. This translation of trajectory points can be seen in FIG. 3, as the local westerly wind is applied to the trajectory points 41 to determine the wind-adjusted trajectory points 45. The more distant trajectory points are subject to a greater degree of drift since the time taken to reach them is longer and so there is more time for the aircraft to have been acted upon by the wind.

As such, a series of wind-adjusted trajectory points 45 are determined, and so a wind-adjusted current trajectory 47 is then plotted by joining the wind-adjusted trajectory points 45. In the example of FIG. 3, although the aircraft 11 is currently flying directly North, the local easterly wind will alter the current trajectory 47 and push the aircraft 11 East if the current control inputs are maintained.

At step 29, the left trajectory 51 is determined, factoring in the local wind data, up until the point at which the aircraft 11 has performed a complete U-turn (through 180°). The left trajectory 51 is determined by taking each of the wind adjusted trajectory points 45 which were defined at step 27, and adjusting them to consider where the aircraft 11 would be if, at the current time, the aircraft 11 rolled left at its maximum achievable roll rate. As such, a series of left-roll-adjusted trajectory points 49 is determined, and joining these left-roll-adjusted trajectory points 49 plots a left trajectory 51.

At step 31, a right trajectory 55 is determined, factoring in the local wind data, up until the point at which the aircraft 11 has performed a complete U-turn (through 180°). The right trajectory is determined by taking each of the wind adjusted trajectory points 45 which were defined at step 27, and adjusting them to consider where the aircraft 11 would be if, at the current time, the aircraft 11 rolled right at its maximum achievable roll rate. As such, a series of right-roll-adjusted trajectory points 53 is determined, and joining these right-roll-adjusted trajectory points 53 plots a right trajectory 55.

Figure 3:
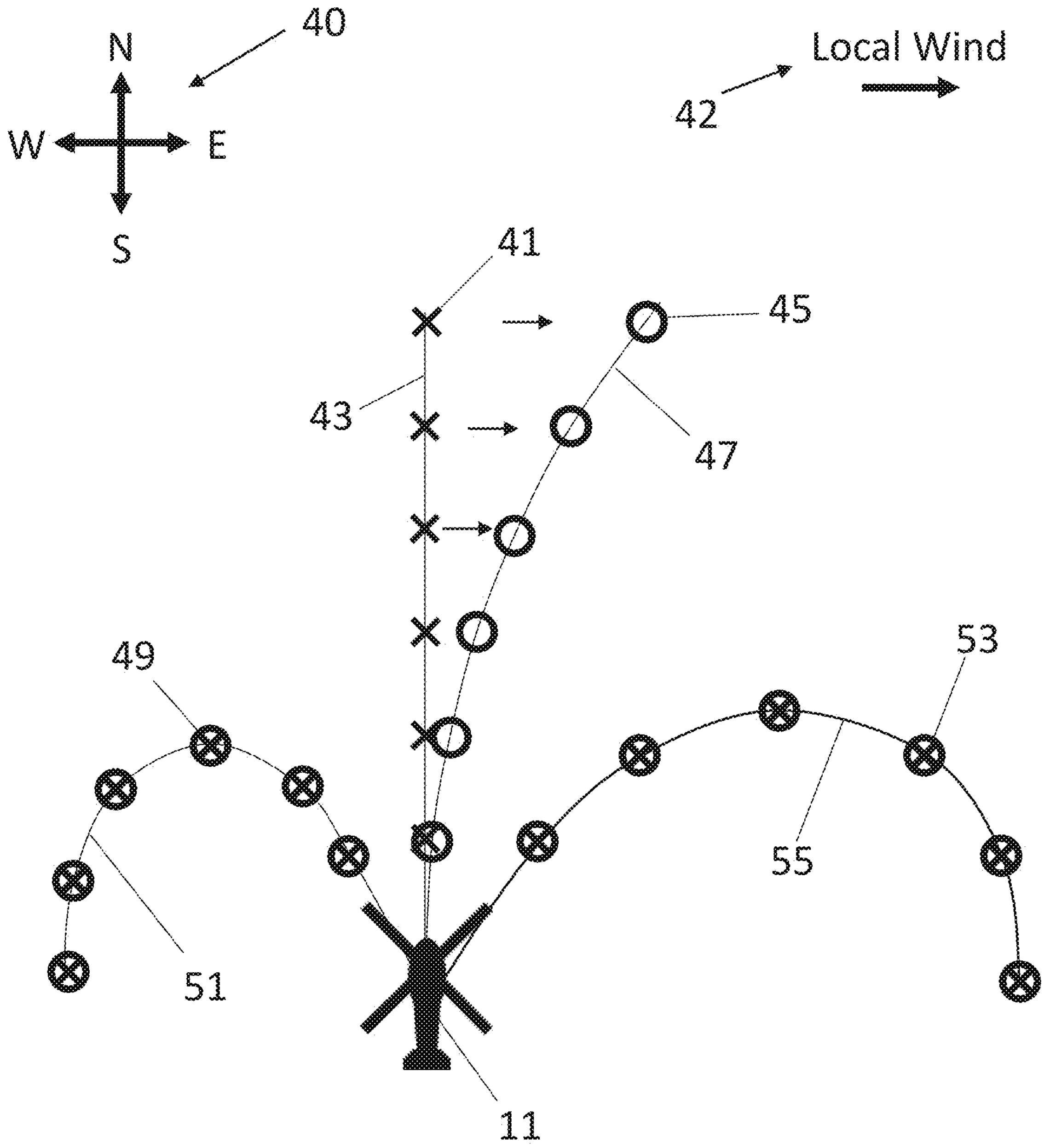
FIG. 3 shows trajectories as calculated using the method of FIG. 2, in accordance with one or more embodiments of the present disclosure.

It can be seen from FIG. 3, owing to the effect of the local wind 42, the left trajectory 51 (turning West, into the wind) shows a tighter turn than the right trajectory 55 (turning East, with the wind).

Although in the discussed example the left and right trajectories are calculated using the wind adjusted trajectory points 45, in other examples, the non-wind adjusted trajectory points 41 (i.e., the non-wind adjusted current trajectory 43) may be used in the same way as described above in relation to steps 29 and 31. The trajectories provided by such examples will not be as accurate as wind-adjusted trajectories, but may still be used as a guide, for example if local wind data is temporarily unavailable.

For simplicity of explanation, the trajectory points and trajectories of FIG. 3 have been plotted in 2 dimensions (2D). It will be understood that the trajectory points and trajectories are in fact plotted in a three-dimensional (3D) coordinate frame such that intersections between the trajectories and the terrain elevation grid can be determined, as explained below in relation to step 35.

At step 33, data indicative of the local terrain elevation grid is obtained from the terrain elevation database 7. In some examples, the aircraft 11 includes a terrain elevation database 7 and so the terrain elevation grid data can be obtained directly from the database 7 in the aircraft 11. In some examples, the calculation unit 3 may communicate with a remote terrain elevation database 7 to obtain the terrain elevation grid data (e.g., via a network connection, radio connection, satellite connection, etc.).

At step 35, the calculation unit 3 determines if any intersections exist between the local terrain elevation grid and each of the determined current, left, and right, trajectories. This is done by checking for any matches (i.e., intersections) between 3D coordinates which lie on the trajectories and 3D coordinates which lie on the local elevation grid.

At step 36, the output of the calculation unit 2 is displayed to the aircraft operator on the display unit 5. The display of the determined trajectories and intersections with the terrain elevation grid, will be explained with relation to FIGS. 4 and 5.

Figure 4:
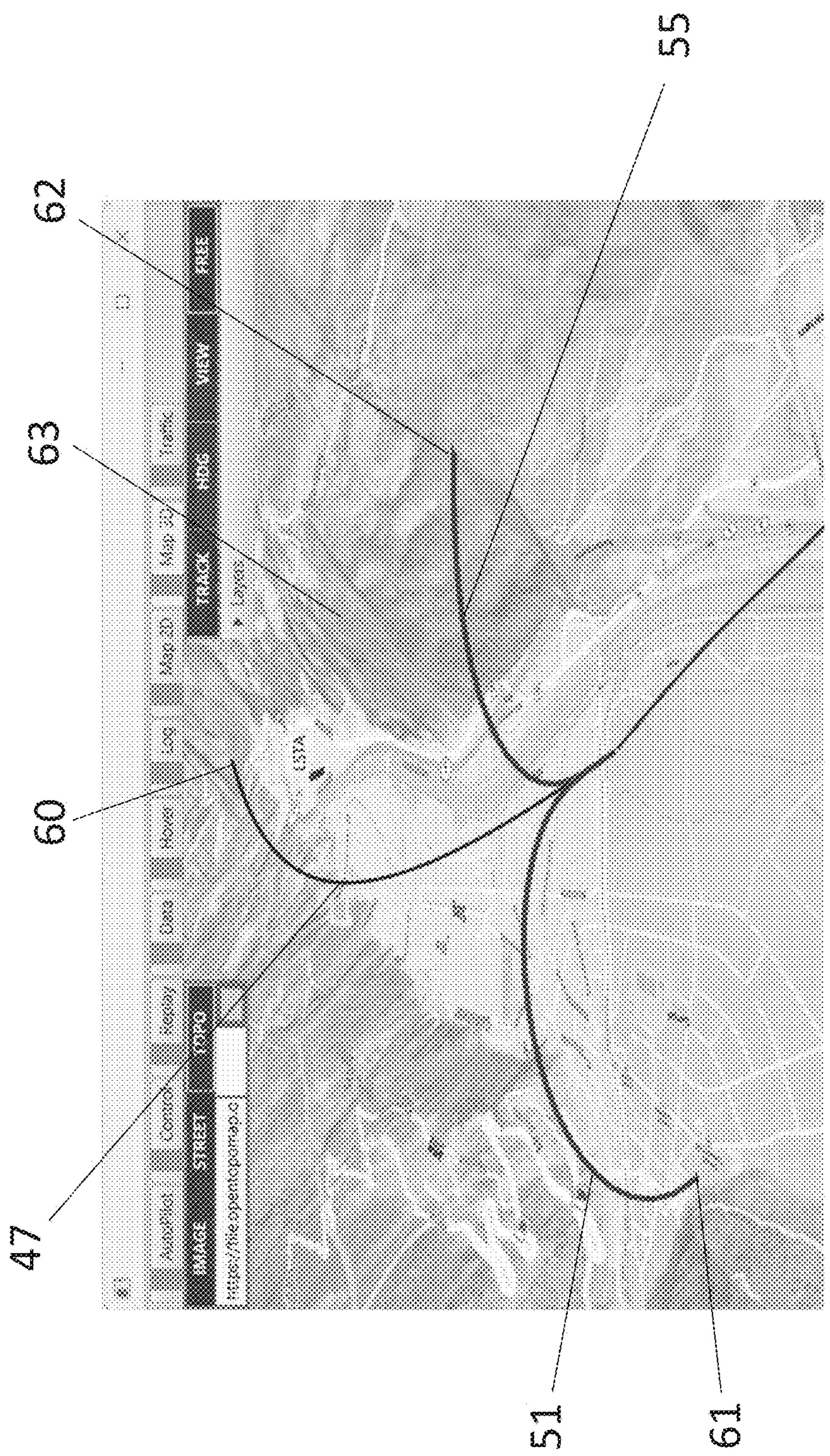
FIG. 4 shows an example of an indication provided on a display unit, in accordance with one or more embodiments of the present disclosure.
Figure 5:
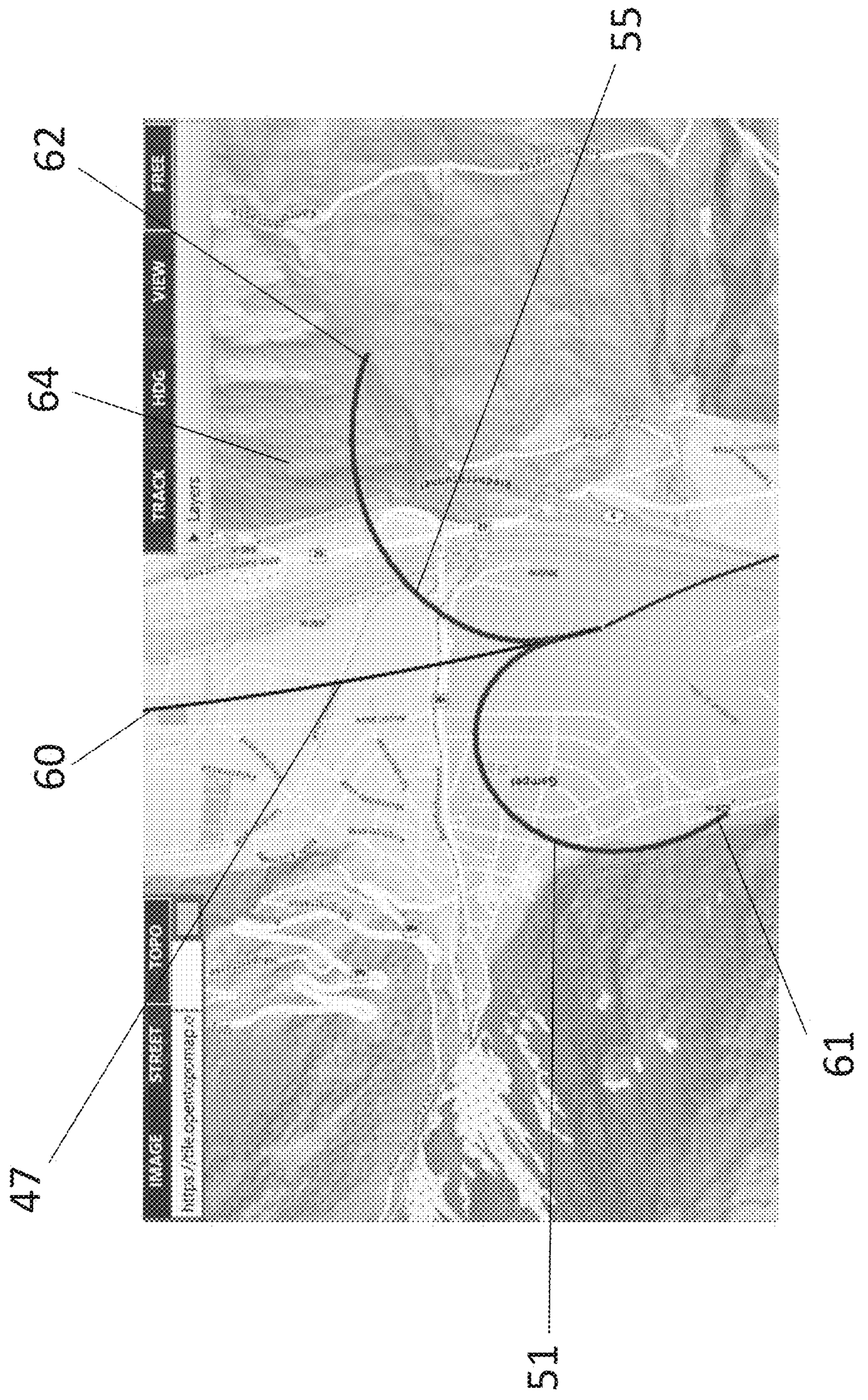
FIG. 5 shows an example of an indication provided on a display unit, in accordance with one or more embodiments of the present disclosure.

FIG. 4 shows a display unit 5 displaying the current 47, left 51, and right 55 trajectories in a 3D exocentric view overlaid on a 3D rendering of the local landscape 63 (a visual representation of the local terrain elevation grid). Meanwhile, FIG. 5 shows the same current, left, and right trajectories in a 2D view on a 2D rendering of the local landscape 64.

As can be seen from FIG. 3, step 36 includes three options.

The option represented by step 37 of the flow chart is where no intersection exists between the local elevation grid and the determined current trajectory. In this case, on the display unit 5, the displayed trajectory is cut at the point 60 which the aircraft 11 will have reached at the end of the time period ΔT. In FIGS. 4 and 5, it can be seen that the current trajectory 47 does not intersect with the terrain elevation grid (i.e., the current course can be maintained without the aircraft contacting the terrain).

The option represented by step 38 of the flow chart is where no intersection exists between the local elevation grid and the one or both of the determined left and right trajectories. In this case, on the display unit 5, the displayed trajectory is cut at the point of the U-turn 61. In FIGS. 4 and 5, it can be seen that the left trajectory 51 does not intersect with the terrain elevation grid (i.e., a maximum achievable roll left manoeuvre can be performed without the aircraft contacting the terrain) and so the left trajectory 51 is cut at the point of the U-turn 61.

The option represented by step 39 of the flow chart is where an intersection exists for any of the current, left, or right trajectories. In this case, in the illustrated example, the displayed trajectory is cut at the point at the point of intersection. It can be seen from FIG. 4 and FIG. 5, that the right trajectory intersects with the local terrain elevation grid at point 62. As such, the trajectory is cut at this point to display to the aircraft operator that a maximum achievable roll right manoeuvre cannot be performed without the aircraft contacting the terrain before a U-turn is achieved.

Of course, the manner in which the intersection is displayed to the aircraft operator can differ from the display illustrated in FIGS. 4 and 5. For example, the displayed trajectory may not be cut, but the portion of the trajectory after the intersection may be displayed in a different colour, or as a dashed line. In some examples, the point of intersection may be emphasised, e.g., with an icon such as a star. In some examples, the display may also include an explicit warning, e.g., "LEFT ROLL—SAFE, RIGHT ROLL—TERRAIN CONTACT".

In the example explained in relation to FIG. 2, the output of the method 20 is a display to a pilot (either a pilot on board the aircraft or a remote pilot). It will however be understood that, in some examples, the output of the method could be provided to an autonomous piloting system. In such examples, the indication of any intersections between the local elevation grid and the determined trajectories may not involve a display but instead, the indication may be given as a signal to an autonomous piloting system.

It will be understood that the disclosed method is iterative, and will be repeated continuously throughout the aircraft's flight. As such, the calculated trajectories and any determined terrain intersections are dynamic. It will be understood that not all steps of the method 20 may need to be repeated continuously. For example, the characteristic aircraft data (e.g., maximum achievable roll) of an aircraft is fixed information and so once this has been acquired, it does not need to be acquired repeatedly.

It will therefore be seen that the system of the present disclosure has the potential to warn an aircraft operator of the aircraft capability to perform a lateral turn to avoid terrain. By viewing the determined trajectories, the aircraft operator can quickly make the appropriate decision to turn to the correct side without needing to make a judgement as to which way may be safer. Such a judgement will take time which delays action, but also may be incorrect, especially in the case of strong winds. As such, the disclosed methods and systems have the potential to reduce the risk of a collision with the terrain, and also to lower the stress level of the aircraft operator in case of emergency, enhancing their ability to manage the situation.

The disclosed systems and method may be more relevant to rotorcraft such as helicopters since these aircraft typically have less rapid climbing capability that fixed wing aircraft such as aeroplanes. However, the disclosed systems and methods may be used with any type of aircraft.

The invention claimed is:

1. A method for calculating lateral avoidance trajectories for an aircraft, the method comprising:

obtaining aircraft data indicative of current aircraft position, current track, current roll, current airspeed, current vertical speed, current altitude, and maximum achievable roll of the aircraft;

calculating, based on the obtained aircraft data, a current trajectory of the aircraft from the current aircraft position;

calculating, based on the obtained aircraft data, a left trajectory of the aircraft corresponding to the aircraft turning left at the maximum achievable roll from the current aircraft position;

calculating, based on the obtained aircraft data, a right trajectory of the aircraft corresponding to the aircraft turning right at the maximum achievable roll from the current aircraft position;

obtaining local terrain elevation grid data;

determining intersections between the local terrain elevation grid and each of the current trajectory, the left trajectory, and the right trajectory; and providing an indication of any intersections between the local terrain elevation grid and each of the current trajectory, the left trajectory, and the right trajectory.

2. The method as claimed in claim 1, the method comprising obtaining local wind data including at least current wind direction and current wind speed, wherein the current trajectory, the left trajectory, and the right trajectory are calculated based on the obtained aircraft data and on the obtained local wind data.

3. The method as claimed in claim 2, wherein calculating the current trajectory comprises:

calculating the current trajectory in a still air mass; and modifying the trajectory using the obtained local wind data.

4. The method as claimed in claim 1, wherein the method comprises calculating the current trajectory for a time period $\Delta T$ from the current time.

5. The method as claimed in claim 4, wherein calculating the current trajectory comprises:

determining a projected position of the aircraft at a plurality of points in time, wherein the plurality of points in time are separated by a time interval $\Delta t$, and wherein $\Delta t<\Delta T$.

6. The method as claimed in claim 5, wherein calculating the left and right trajectories comprises:

for each point in time on the current trajectory, calculating where the aircraft would be if it turned left or right at the maximum achievable roll.

7. The method as claimed in claim 2, wherein calculating the current trajectory comprises:

calculating the current trajectory in a still air mass; and modifying the current trajectory using the obtained local wind data, wherein calculating the current trajectory further comprises, for each point in time on the current trajectory, calculating where the aircraft would be when applying the obtained local wind data.

8. The method as claimed in claim 1, further comprising:

calculating the left and right trajectories to a point of U-turn.

9. The method as claimed in claim 1, wherein the indication is provided as a visual indication on a display unit to an aircraft operator.

10. The method as claimed in claim 9, wherein the indication comprises displaying the current trajectory, the left trajectory, and the right trajectory.

11. The method as claimed in claim 10, further comprising:

displaying the current, left, and right trajectories on a representation of an electronic map.

12. The method as claimed in claim 10, further comprising:

displaying the current, left and right trajectories from an egocentric view or exocentric view.

13. The method as claimed in claim 1, wherein the aircraft data comprises:

dynamic aircraft data including dynamic data indicative of the current aircraft position, the current track, the current roll, the current airspeed, the current vertical speed, and the current altitude; and characteristic aircraft data including fixed data indicative of the maximum achievable roll.

14. The method as claimed in claim 13, further comprising:

obtaining the dynamic and characteristic aircraft data separately.

15. A system for calculating lateral avoidance trajectories for an aircraft, the system comprising:

a calculation unit configured to:

obtain aircraft data including at least current aircraft position, current track, current roll, current airspeed, current vertical speed, current altitude, and maximum achievable roll of the aircraft;

calculate, based on the obtained aircraft data, a current trajectory of the aircraft;

calculate, based on the obtained aircraft data, a left trajectory of the aircraft corresponding to the aircraft turning left at the maximum achievable roll;

calculate, based on the obtained aircraft data, a right trajectory of the aircraft corresponding to the aircraft turning right at the maximum achievable roll;

obtain local terrain elevation grid data from a terrain elevation database; and determine intersections between the local terrain elevation grid and each of the current trajectory, the left trajectory, and the right trajectory; and an indication unit configured to provide an indication of any intersections between the local terrain elevation grid and each of the current trajectory, the left trajectory, and the right trajectory.

* * * * *